United States Patent [19]

Harvey

[11] 4,410,065
[45] Oct. 18, 1983

[54] MULTI-LAYER ACOUSTIC LININGS

[75] Inventor: John D. Harvey, Matlock, England

[73] Assignee: Rolls-Royce Limited, London, England

[21] Appl. No.: 254,491

[22] Filed: Apr. 15, 1981

[30] Foreign Application Priority Data

May 17, 1980 [GB] United Kingdom ............... 8016395

[51] Int. Cl.³ .................. F04F 17/04; F01N 1/02; F01N 1/24
[52] U.S. Cl. ................... 181/224; 181/222; 181/241; 181/286; 181/292
[58] Field of Search ............ 181/209, 213, 215, 216, 181/219, 224, 286–293, 207, 277, 241, 222; 415/119

[56] References Cited

U.S. PATENT DOCUMENTS

| | | | |
|---|---|---|---|
| 2,320,668 | 6/1943 | Smith | 181/277 |
| 2,988,302 | 6/1961 | Smith | 181/222 |
| 3,630,312 | 12/1971 | Woodward | 181/292 |
| 3,937,590 | 2/1976 | Mani | 181/207 X |
| 4,104,002 | 8/1978 | Ehrich | 181/222 X |
| 4,235,303 | 11/1980 | Dhoore et al. | 181/286 |
| 4,294,329 | 10/1981 | Rose et al. | 181/286 |

Primary Examiner—Benjamin R. Fuller
Attorney, Agent, or Firm—Cushman, Darby & Cushman

[57] ABSTRACT

An acoustic lining for a flow duct has a first perforate skin fixed to an underlying sound-absorbing layer. The first perforate skin is overlain by a second perforate skin which forms the wall of the flow duct. One of the skins is relatively moveable in a sliding sense with respect to the other skin so as to vary the acoustic impedance of the duct wall as the perforations in the respective skins slide into and out of registration with each other. This enables the acoustic impedance of the duct wall to be varied to suit the flow and noise conditions prevailing in the duct and so obtain optimum noise attenuation in the duct, which may be the intake duct of a turbofan aero-engine.

12 Claims, 3 Drawing Figures

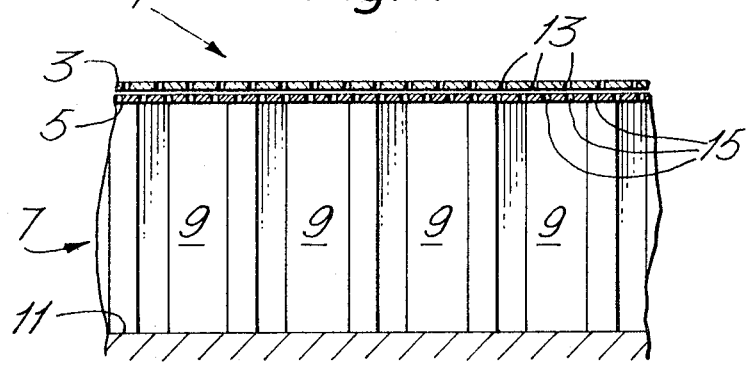
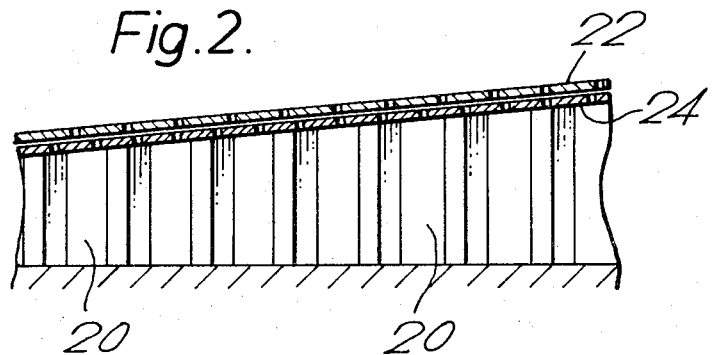
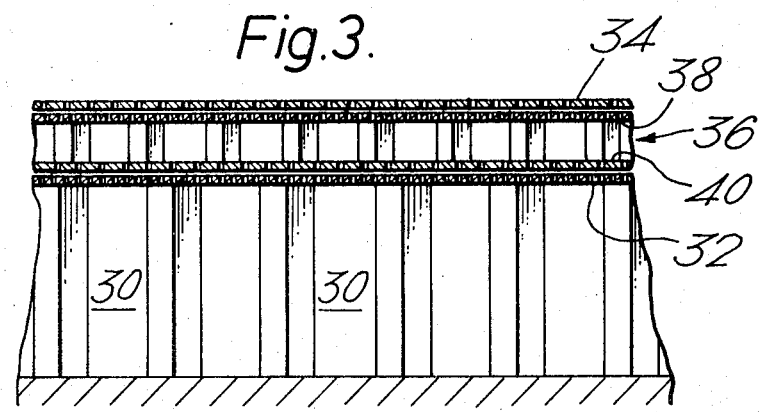

MULTI-LAYER ACOUSTIC LININGS

This invention relates to multi-layer acoustic linings for the flow ducts of fluid flow machines, and in particular to acoustic linings which allow the acoustic impedance of the duct wall to be varied. The fluid flow machines may in particular be gas turbine engines or models or test rigs used in development of such engines.

One of the problems in designing acoustic linings for gas turbine engines is that the characteristics of the noise and the gaseous flow in the flow ducts vary widely over the operating range of the engine. In gas turbine aeroengine inlet and exhaust ducts for example, these characteristics change significantly between take-off, cutback and approach/landing power levels, and ideally the acoustic impedance of the duct wall forming the face of the acoustic lining should be matched to the characteristics prevailing at each power level in order to obtain maximum noise reduction. The characteristics also change between upstream and downstream portions of the duct at each power level.

The characteristics in question are noise intensity, frequency and mode of propagation, and the speed of the gaseous flow over the face of the lining.

Conventional acoustic linings, as used in gas turbine aeroengine flow ducts, typically comprise a porous or perforated facing skin which forms at least part of the peripheral wall of the flow duct; the facing skin overlies a sound-absorbing layer comprising a resonant airspace structure or a bulk sound-absorbing material. The design of such a lining must either be a compromise between the conflicting requirements of different engine power levels, or else be such that the lining is of optimum effectiveness at one particularly troublesome power level, such as take-off.

In the present specification and claims, the expressions "perforate" or "perforated" in relation to skins should not be taken to refer merely to metal or other homogenous material skins or sheets having perforations (i.e. small holes) formed in them at some stage during manufacture, but should also be taken to refer to woven or felted fibrous skins, such as fibre-reinforced resin sheets, or sintered metal fibre sheets, having such holes therein.

The present invention provides a simple and convenient mechanical means whereby the acoustic impedance of the acoustic lining may be varied to suit the conditions prevailing in the flow duct, and although applicable to gas turbine engines when installed in aircraft for commercial purposes, is also applicable to models of such engines and test rigs for such engines during research and development programmes for the purpose of optimising the design of acoustic linings for the engines.

According to the present invention, an acoustic lining for a flow duct in a fluid flow machine, such as a gas turbine engine, has a perforated facing skin adapted to form at least part of a wall of the flow duct, said perforate facing skin overlying a further perforate skin and said skins being relatively moveable in a contact or non-contact sliding sense with respect to each other to vary the acoustic impedance of said wall.

The perforations in one skin may be spaced differently from the perforations in the other skin such that in at least one selected position of the skins relative to each other, the acoustic impedance of the duct wall is non-uniform over the extent of the acoustic lining. The perforations may form orthogonal or non-orthogonal patterns across the extent of the skins, and the perforations in the patterns may be uniformly or non-uniformly spaced from each other.

The effect of such variation in the spacing of the perforations may be calculated to render the acoustic impedance of the duct wall non-uniform in the direction of the length of the duct in order to take account of varying characteristics of the noise and the flow along the length of the duct. In addition to, or instead of, non-uniform acoustic impedance in the direction of the length of the duct, non-uniform impedance may also be obtained peripherally of the duct in order to preferentially absorb and reflect noise impinging on preselected portions of the duct wall.

To absorb noise propagating along the duct in a spiral mode, the perforations may be spaced so that in at least one selected position of the skins relative to each other, regions of minimum impedance form a helical pattern around the periphery of the duct to at least partially match the pattern of inpingement of the noise on the duct wall.

Relative movement between the skins may be achieved by limited movement of one of the skins peripherally of the duct, as by relative rotation around a commmon axis about which the skins are concentrically arranged. An alternative way of achieving the relative movement is to move one of the skins longitudinally of the duct.

In one version of the invention, the facing skin is moveable with respect to the underlying further skin, which is attached to a fixed sound-absorbing layer.

In another version of the invention, the facing skin is fixed and the further skin is moveable with respect to it, the further skin being attached to a moveable sound-absorbing layer which overlies a fixed sound-absorbing layer. Additional sound-permeable skins are preferably attached to the fixed and moveable sound-absorbing layers respectively to form a septum between said sound-absorbing layers. The septimal skins may have perforations therein so that when the moveable sound-absorbing layer is moved with respect to the fixed sound-absorbing layer, the acoustic impedance of the septum alters.

The fixed and/or moveable sound-absorbing layers may comprise resonant airspace structures, and/or bulk sound-absorbing materials.

In one variation, the fixed sound-absorbing layer is a resonant airspace structure whose resonant frequency is non-uniform over the extent of the lining, this being achieved, for example, by utilising a honeycomb cellular structure in which the depth of the cells is non-uniform. The resonant frequency may advantageously vary lengthwise of the duct in order to take account of variation of prevailing frequency over the length of the duct.

Embodiments of the invention will now be described by way of example only, with reference to the accompanying drawings, in which:

FIG. 1 is a cross-sectional edge elevation of an acoustic lining according to the invention, the acoustic lining having a single sound-absorbing layer;

FIG. 2 is a cross-sectional edge elevation of a variation of the embodiment of FIG. 1; and FIG. 3 is a cross-sectional edge elevation of an embodiment of the invention utilising two sound-absorbing layers.

Referring now to FIG. 1, a multi-layer acoustic lining 1 for a flow duct, such as the intake duct in a turbofan aeroengine, has a perforate facing skin 3 which forms the peripheral wall of the flow duct and overlies a further perforate skin 5. Skin 5 is attached to and covers a sound absorbing layer 7, which takes the form of a resonant airspace structure comprising honeycomb cells 9 of conventional type. The honeycomb cells 9 are backed by an impervious layer 11, which is a structural casing of the duct, and are attached thereto.

Layer 7 with skin 5 is of course immoveable with respect to the casing 11, but in order to attain variability in the acoustic impedance of the duct wall in accordance with the present invention, facing skin 3 is moveable in a non-contact sliding sense with respect to skin 5. Alteration of the acoustic impedance is thus obtained by varying the degree of acoustic coupling between sound-absorbing layer 7 and the duct, i.e. by varying the degree to which perforations 13 and 15 in skins 3 and 5 are in registration with each other, and hence also the ease with which sound or shock-waves impinging on skin 3 can excite resonance in the honeycomb cells 9. The spacings of the perforations 13,15 in the skins 3 and 5 respectively are chosen so that at various selected positions of the moveable skin 3 with respect to fixed skin 5, the duct wall formed by the skins, or certain selected portions of that duct wall, has or have an acoustic impedance appropriate to the conditions in the duct at the time when the selected positions are achieved.

A simple example will be given to illustrate the above principle. Suppose the acoustic lining 1 to be installed in the intake of the fan of a high by-pass ratio turbo-fan aeroengine. At take-off conditions, when the velocity of the airflow over the duct wall is high, a low acoustic impedance is desirable; when the aircraft is landing, the flow through the fan is low relative to take-off and hence the velocity of the airflow over the duct wall is also low, thus requiring a high acoustic impedance for optimum noise absorption; at cut-back conditions subsequent to take off, the airflow velocities are at a medium value, and a medium acoustic impedance is desirable. One way in which these three values of acoustic impedance can be achieved is by providing each skin 3 and 5 with perforations which are of the same size and regular pattern of spacing on both skins (this is not the case in FIG. 1). At a first selected position of skin 3, chosen during take-off, the perforations in skin 3 would be in registration with those in skin 5, and the duct wall would have a minimum acoustic impedance. At a second selected position of skin 3, chosen during landing maneouvres, the perforations in skin 3 would be in registration with the mid-points between the perforations in skin 5, and the duct wall would have maximum acoustic impedance. At a third position of skin 3, intermediate between the first and second positions and chosen during cut-back conditions, the perforations in skin 3 would be offset from the perforations in skin 5 by a lesser amount than at the second position, and the duct wall would have an intermediate acoustic impedance.

In the above example, the size and spacing of the perforations in the respective skins 3 and 5 are identical, and hence at each position of the skin 3 the acoustic impedance of the duct wall is uniform over the extent of the acoustic lining. However, for various reasons to be mentioned later, it is desirable to be able to select positions of the skin 3 which cause the acoustic impedance of the duct wall to be non-uniform over the extent of the lining. This can be achieved if the perforations in one skin are spaced differently from those in the other skin, as is the case with perforations 13 and 15 in FIG. 1.

For instance, during take-off of a high by-pass ratio turbo-fan engine, the flow characteristics vary appreciably over the length of the air intake duct, and it could therefore be desirable to utilise the invention to cause upstream and downstream portions of the acoustic linings forming the intake duct wall to have differing acoustic impedances. Since the largest air flow velocities occur at the narrowest duct sections, the duct wall here should have a lower acoustic impedance than the duct wall nearer the intake. This can be achieved, for example, by arranging that each skin 3 and 5 has substantially the same size of perforations and the same porosity as the other (the "porosity" is the ratio of the open area of a skin to the solid area), but that the spacing of the holes, though identical in both skins in the periheral direction, is slightly greater or less in one skin that in the other in the longitudinal direction. Thus, when the skin 3 is positioned so that rows of perforations in the downstream portions of the skins are in or near registration with each other, giving a low acoustic impedance, rows of perforations in the upstream portions of the skins will be offset from each other, giving a higher acoustic impedance. The position of skin 3 can of course be altered to take account of differing conditions at cutback and landing power levels.

The sound-pressure field generated by an axial flow fan in a turbo-fan aeroengine can be considered to contain rotating pressure patterns (spinning modes) which are produced by interaction between the fan and succeeding fixed structure, such as engine support struts or exit guide vanes. These modes propagate from the fan towards the intake in a spiral or helical fashion. Some high frequency modes attenuate naturally and rapidly within the duct, and are also satisfactorily absorbed by conventional acoustic linings, but other lower order modes are effectively transmitted to the mouth of the intake and radiate objectionable noise to the far field, the directionality and intensity of the noise being dependent on the type of propagating mode.

U.S. Pat. No. 3,937,590 discloses that peripherally segmented acoustic linings (in which longitudinally extending strips of sound absorbing material are angularly spaced around the periphery of the duct wall, or in which such strips are alternated peripherally with other sound-absorbing strips having a different acoustic impedance) are effective to scatter the acoustic energy of the spinning modes and increase the proportion of rapidly attenuating high frequency modes. It also shows how longitudinally (i.e. axially) segmented acoustic linings (in which peripherally extending strips of sound absorbing material are longitudinally spaced along the length of the duct wall, or in which such strips are alternated with other sound-absorbing strips having a different acoustic impedance) enhances attenuation by ensuring repeated reflections and providing a periodic structure which functions to "filter" the sound. The patent also discloses "chequerboard" patterns of acoustic impedance. It will readily be seen that the present invention provides a means by which such peripherally or longitudinally segmented acoustic treatments can be realised, the patterns of the perforations in the moveable and fixed sheets being such as to produce, when the moveable skin is moved to a predetermined position, peripherally or longitudinally extending bands of low acoustic impedance, in which the holes in the two skins are in or near registration with each other, alternating with bands of high acoustic impedance, in which the holes are out of registration. The present invention also allows chequerboard patterns to be achieved in similar manner.

U.S. Pat. No. 4,104,002 discloses an acoustic duct with a segmented acoustic lining in which circumferentially spaced strips of sound-absorbing material extend helically about the periphery of the duct and are effective to scatter the acoustic energy of the spinning modes and increase the proportion of rapidly attenuating modes. Here again, the present invention provides a means of realising such an arrangement, the patterns of the perforations being such that at a predetermined position of the moveable sheet, helically extending bands of low acoustic impedance alternate with helically extending bands of high acoustic impedance.

In the two U.S. patents mentioned above, the various forms of segmented acoustic linings are fixed in position and their acoustic impedances cannot be varied to suit changing engine conditions; hence their design is optimised to give maximum attenuation of spinning modes at a particularly troublesome engine condition, but at other conditions, which may be only a little less troublesome, the linings are not operating at their design condition and are thus not so efficient. The present invention contributes to overcoming this problem because by it the acoustic impedance of the lining can be varied to take account of changing engine conditions, thus enabling the acoustic lining to give good attenuation at all conditions, or at least at more than one condition. For example, the pitch of the helices in the spinning noise modes changes with the rotational speed of the fan, and to take account of this the pitch of the helical bands of low and high acoustic impedance can be changed by varying the position of the moveable skin to match the pattern of impingement of the noise on the duct wall.

In order to determine what patterns of perforations in the fixed and moveable sheets are necessary in order to produce the desired variations in acoustic impedance of the acoustic lining (i.e. the variations due to changes in position of the moveable sheet, and the variations with respect to the longitudinal and peripheral extents of the lining,) reference may be had to the principle of Moire patterns. By this principle, if a transparent sheet, ruled with a grid of lines, is placed over another sheet, ruled with a grid of lines skewed with respect to the first sheet and/or having a different spacing, a repeating pattern will be formed, the characteristics of the repeating pattern being dependent on the nature of the difference in spacing between the grids and the amount of skewing. Note that in the context of this invention, the repeating patterns are a result of "mechanical" or "line of sight" interference between the grids, and not a result of interference between light-waves, which only occurs when the grid lines are very closely spaced.

Applying the Moire principle to the present invention, one of the perforated skins, say the moveable skin, may be provided with a pattern of perforations in which, for example, longitudinal and latitudinal rows of holes define a square grid pattern. If the fixed skin is provided with a hole pattern which has the same longitudinal spacing between the holes as the moveable skin, but which has a greater or lesser latitudinal spacing between the holes than the moveable skin, longitudinal bands of low acoustic impedance, where the holes are in or near registration with each other, will alternate with longitudinal bands of high acoustic impedance, where the holes are out of registration. Similarly, if the latitudinal spacing of the holes in the fixed skin is the same as in the moveable skin, but the longitudinal spacing is different, latitudinally extending bands of high and low acoustic impedance will be produced. A chequerboard pattern of areas of high and low acoustic impedance will be produced if both latitudinal and longitudinal spacing on the fixed skin are slightly different from those on the moveable skin.

In the foregoing paragraph, the rows of holes in both skins extend longitudinally and latitudinally with respect to a common frame of reference. However, if the holes in both skins are arranged in an orthogonal grid pattern, but the pattern on, say, the fixed skin is skewed relative to that on the moveable skin and the hole spacing on the fixed skin is suitably different from that on the moveable skin, alternate bands of high and low acoustic impedance will be produced which extend diagonally of the grid pattern on the moveable skin. Remembering that the skins are installed in a duct, it will be seen that the invention can readily produce helically extending bands of high and low acoustic impedance around the wall of the duct.

The bands or chequerboard areas of alternate high and low acoustic impedance values alter their position on the acoustic lining when the position of the moveable skin is changed, and this property enables the impedance pattern on the acoustic lining to be altered to match the sound wave patterns in the duct as they change with engine conditions such as fan speed, in order to optimise noise attenuation.

Note that by suitable variation of the spacing in the hole patterns in the duct axial direction, the above-described banded or chequerboard patterns of acoustic impedance can be combined with patterns in which the acoustic impedance varies along the length of the duct to take account of the differing noise and airflow conditions along its length as discussed previously.

It is also possible to incorporate a plurality of different hole patterns on a single skin so that by repositioning the moveable skin a banded acoustic impedance pattern is changed, for example, to a chequerboard pattern, or even a uniform or axially graduated impedance.

There is no necessity for the perforations to be all of the same size, and non-orthogonal patterns of perforations may be used.

Referring once again to the drawings, FIG. 2 shows a variation of the invention in which the honeycomb cells 20 forming the resonant airspace structure are of non-uniform depth, being deeper at one end of the acoustic lining than at the other so that the resonant frequency of the acoustic lining varies lengthwise of the duct. Because the total acoustic impedance of a resonant airspace acoustic lining depends upon the depth of the airspace as well as the properties of the facing skin, this design gives wider scope for varying the acoustic impedance values of the acoustic lining to take account of varying conditions along the length of the duct. By virtue of the variation in depth of the cells 20, a greater range of frequencies can also be attenuated, the shallower cells being placed nearer the duct intake for attentuation of the higher frequencies resulting from breakdown of lower-frequency modes at positions within the duct more distant from the intake. As for FIG. 2, the top facing skin 22 is moveable with respect to the underlying facing skin 24, which is fixed to the honeycomb cell walls.

FIG. 3 is a further development of the invention in which a uniform depth layer of honeycomb cells 30 for low frequency absorption supports a fixed perforated skin 32. (This layer could also be of non-uniform depth in the manner of FIG. 2). The topmost skin 34 is also fixed, but between these two fixed skins 32 and 34 there is a moveable honeycomb layer 36 for high frequency absorption, sandwiched between top and bottom skins 38 and 40 respectively, which are both fixed to the moveable layer 36. Skins 32 and 40 thus form a septum between the two sound-absorbing layers 30 and 36. All the skins are perforated so that when moveable layer 36 changes position, the acoustic impedance of the lining varies because the acoustic impedance of each of the two pairs of skins 34, 38 and 32,40 varies.

In order to ensure adequate acoustic coupling between the duct and the cells 30, the number of perforations per unit area of the two top skins 34,38 is larger than would be needed if the lining only comprised a single sound-absorbing layer.

Applying the various schemes previously described for possible hole patterns in two cooperating skins to FIG. 3, there are plainly many possibilities for matching the acoustic impedance of the acoustic lining to the conditions prevailing in the duct, such applications being readily apparent to the specialist in the light of what has already been said.

In all FIGS. 1 to 3, the compartmented airspace noise absorbing layers could be replaced by bulk noise absorbing materials of a fibrous or foamed nature.

Although the above description has referred only to the noise-reducing possibilities of the invention, a further use of the invention could be to prevent entry of water, fuel or other contaminants into the interior of the acoustic lining via the perforations in the skins. Thus, in one position of the moveable skin, holes in the moveable skin would be in registration with holes in the fixed skin to allow absorption of noise, whilst in another position, adopted when the engine is not running or during flight at times when noise reduction is unimportant, all the holes in both skins would be completely out of registration with each other to prevent entry of the contaminants. This arrangement is of particular value where the noise absorbing layer is not readily drainable or is of a fibrous or porous nature so that it soaks up liquids readily.

Movement of the moveable skins or layers of the invention is easily accomplished using well known means such as hydraulic, pneumatic or electric systems actuating simple crank or cam mechanisms or screw jacks to give movement either peripherally or axially of the duct. The systems need not be large or heavy since they are not required to have large distances of travel—small changes in the relative positions of the skins will produce large changes in acoustic impedance.

In order to take account of the fact that intake ducts of aeroengines tend to vary from perfectly cylindrical form, and to reduce the danger of binding between the skins as the moveable one changes position, the moveable skins should be made in several segments, each segment being individually actuated to vay the acoustic resistance.

If the moveable skin is slideable with respect to the fixed skin in a non-contact sense, the spacing between the two skins, and their relative sliding movement, is facilitated by bearing elements between the two skins. These may merely be strips of low friction material such as polytetrafluoroethylene or nylon.

If the moveable skin is slidable with respect to the fixed skin in a contacting sense, the moveable skin (or complete topmost sound absorbing layer in the case of FIG. 3), could be made of a low friction plastic material. Alternatively, or in addition, the skin surfaces in sliding contact could be coated or impregnated with a dry film lubricant.

It will be seen that the present invention allows optimum noise attenuation to be achieved for at least two engine conditions using only one type of acoustic lining. For example, if the invention is used as an intake duct lining for a turbofan aeroengine, the acoustic impedance could be adjusted to attenuate "buzz-saw" noise at the takeoff condition, and then changed to give optimum attenuation during the landing approach. Furthermore, the acoustic impedance pattern around the acoustic lining could be adjusted to vary the far field distribution of the noise emanating from the mouth of the intake duct, thus redirecting the peak noise levels away from neighbouring or overflown communities.

It would be advantageous to incorporate automatic control of the position of the moveable skin(s) in order to take account of the varying noise attenuation requirements. This can be done by locating one or more microphones on the aircraft or in the engine air intake to feed back the noise signal, filtered if necessary, to a microprocessor, the output from the microprocessor being used to control the moveable skin via a suitable mechanism to maintain optimum absorption of the noise, at least for certain of the most troublesome tones. The microprocessor would be programmed to match actual noise intensity and/or frequency signals to idealised ones for each engine condition of interest.

In the above description with reference to the drawings, the perforated skins may be of a felted or woven fibre-reinforced resin or plastic material, or even of sintered metal fibres, the perforations being formed either in the finished skin by a machining operation as for homogenous metal skins such as punching with dies, or during the weaving or laying-up process of the fibre-sheet (before hardening of the resin or plastic, in the case of fibre-reinforced resin or plastic sheets).

In the above description, particular attention has been paid to operational use of the invention in gas turbine engines for commercial aircraft. However, the invention is also suitable for research and development purposes, e.g. testing of models of turbofan aeroengine intake ducts in order to determine an optimum design for a conventional type of acoustic lining. When utilised for this purpose, the invention can if desired be used without mechanisms or control systems for altering the positions of the moveable skin(s), such alteration being carried out by hand in successive tests.

I claim:

1. An acoustic lining forming at least a part of a peripheral wall of a flow duct in a fluid flow machine, said acoustic lining, while in situ as said at least a part of said peripheral wall absorbing sound without obturating sound and flow of fluid and having acoustic impedances capable of being varied to suit changing flow and noise conditions in said duct and comprising:
   a perforate sound permeable facing skin;
   a further perforate sound permeable skin, said perforate facing skin overlying said further perforate skin; and
   said perforate facing skin and said further perforate skin being relatively movable with respect to each other in a contact or non-contact sliding sense to vary said acoustic impedance to suit the changing flow and noise conditions in said duct.

2. An acoustic lining as claimed in claim 1 in which the perforations in one said skin are spaced apart differently from the perforations in the other said skin such that in at least one selected position of said skins relative to each other, said acoustic impedance of said peripheral wall is non-uniform over the extent of said acoustic lining.

3. An acoustic lining as claimed in claim 1 in which the perforations in at least one of the said skins are spaced non-uniformly such that in at least one selected position of said skins relative to each other, said acoustic impedance of said peripheral wall is non-uniform over the extent of said acoustic lining.

4. An acoustic lining as claimed in claim 2 or claim 3 in which said acoustic impedance of said peripheral wall is non-uniform in the direction of the length of said flow duct.

5. An acoustic lining as claimed in claim 2 or claim 3 in which said acoustic impedance of said peripheral wall is non-uniform in the peripheral direction.

6. An acoustic lining as claimed in claim 2 or claim 3 in which in at least one selected position of said skins relative to each other, the perforations of the same form a helical pattern around said duct with regions of minimum and maximum impedance.

7. An acoustic lining as claimed in claim 1 having a fixed sound-absorbing layer to which said further skin is attached, said facing skin being moveable with respect to said further skin.

8. An acoustic lining as claimed in claim 1, having a fixed sound-absorbing layer and a moveable sound-absorbing layer overlying said fixed sound-absorbing layer, said further skin being attached to said moveable sound-absorbing layer and said facing skin being fixed whereby said further skin is moveable with respect to said facing skin.

9. An acoustic lining as claimed in claim 8 in which said sound-permeable skins attached to said fixed sound-absorbing layer and said moveable sound-absorbing layer respectively form a sound permeable septum between said sound-absorbing layers.

10. An acoustic lining as claimed in any one of claims 8 to 9 in which at least one of said sound absorbing layers comprises a resonant airspace structure.

11. An acoustic lining as claimed in any one of claims 7 to 9 in which the fixed sound-absorbing layer comprises a resonant airspace structure.

12. An acoustic lining as claimed in claim 11 in which the resonant frequency of the resonant airspace structure is non-uniform over the extent of the acoustic lining.

* * * * *